United States Patent Office 3,446,822
Patented May 27, 1969

3,446,822
METHOD FOR COLOR IMPROVING 5,6,7,8,9,9-HEXAHALO - 1,2,3,4,4a,5,8,8a - OCTAHYDRO-5,8-METHANO-2,3-NAPHTHALENE DICARBOXYLIC ANHYDRIDE BY TREATMENT WITH A LOWER MONOHYDRIC ALKYL ALCOHOL
Morris Dunkel, Paramus, N.J., and Masao Yafuso, New York, N.Y., assignors to Universal Oil Products Company, Des Plaines, Ill., a corporation of Delaware
No Drawing. Filed Oct. 1, 1965, Ser. No. 492,294
Int. Cl. C07d 5/32; C07b 29/00
U.S. Cl. 260—346.3
5 Claims

ABSTRACT OF THE DISCLOSURE

A method for lightening the color of 5,6,7,8,9,9-hexahalo - 1,2,3,4,4a,5,8,8a - octahydro-5,8-methano-2,3-naphthalene dicarboxylic acid anhydride by treating said anhydride with a monohydric alcohol of one to five carbons at a temperature of from about 15–50 degrees C. at which temperature the anhydride is insoluble and then separating the color improved alcohol from the anhydride.

---

This invention relates to the color improvement and purification of polyhalopolyhydromethanonaphthalenedicarboxylic anhydrides and more particularly relates to a process for color improving 5,6,7,8,9,9-hexachloro-1,2,3,4,4a,5,8,8a - octahydro - 5,8-methano-2,3-naphthalenedicarboxylic anhydride.

Polyhalopolyhydromethanonaphthalenedicarboxylic anhydrides, which for convenience are hereinafter referred to as polyhalo anhydrides, are valuable industrial chemicals having unique utility for inducing flame retarding properties to plastic materials such as polyesters. To induce such properties to the plastic materials, it is generally necessary to chemically incorporate the polyhalo anhydrides into the plastic materials during their preparation. Since it is essential to the commercial success of these flame retardant plastic materials in many applications, such as protective coating and films, that they be light colored, it is an absolute requirement that the polyhalo anhydrides incorporated into the plastic materials be initially of a light color and do not contain color forming bodies so as to avoid any unnecessary darkening of the plastic materials. The obtainment of light colored polyhalo anhydrides has heretofore, however, been extremely difficult to readily achieve, as these anhydrides are usually contaminated during their preparation with minute quantities of darkening impurities which are very difficult to remove. It has now been discovered, however, that these darkening impurities may be readily removed and the color of the polyhalo anhydrides substantially improved by treating the polyhalo anhydrides with an alcohol which surprisingly does not simultaneously result in any chemical interaction to form the corresponding esters of the polyhalo anhydrides.

Accordingly, an object of this invention is to provide a process for purifying and color improving polyhalo anhydrides which renders such anhydrides lighter and therefore more commercially acceptable for use in preparing flame retarding light color plastic materials. Another object of this invention is to provide a process for color improving polyhalo anhydrides by treating such anhydrides with an alcohol whereby a substantial lightening of the anhydrides is effected, economically, and with substantially no loss or chemical destruction of the polyhalo anhydrides.

The polyhalo anhydrides, that is, polyhalopolyhydromethanonaphthalenedicarboxylic anhydrides which may be color improved and purified according to the process of this invention are prepared by the Diels-Alder condensation of a halo substituted cyclopentadiene and tetrahydrophthalic anhydride according to the general procedures described in Re. 25,430. Examples of halo substituted cyclopentadienes which may be used in the Diels-Alder reaction include dichlorocyclopentadiene, hexachlorocyclopentadiene, dibromocyclopentadiene, hexabromocyclopentadiene or 1,2,3,4 - hexachloro-5,5-dibromocyclopentadiene. The Diels-Alder condensation is usually effected by charging the reactants with or without an inert solvent, or when a solvent is not used preferably with an excess of the halo substituted cyclopentadiene, to a suitable reaction vessel wherein the reactants are heated at temperatures of from about 100° to 250° C. for a time sufficient to complete the reaction. The reaction mixture is thereupon cooled and the crystallized product separated, washed with organic liquids such as toluene and dried. Examples of the polyhalo anhydrides prepared according to this method include: 5,6,7,8,9,9-hexachloro-1,2,3,4,4a,5,8,8a - octahydro - 5,8-methano-2,3-naphthalene - dicarboxylic anhydride; 5,6,7,8,9,9-hexabromo-1,2,-3,4,4a,5,8,8a - octahydro- 5,8-methano-2,3-naphthalenedicarboxylic anhydride; or 9,9-dibromo-5,6,7,8-tetrachloro-1,2,3,4,4a,5,8,8a - octahydro - 5,8-methano-2,3-naphthalenedicarboxylic anhydride.

As hereinbefore indicated, the polyhalo anhydrides which are prepared either in a batch or continuous-type process according to the above Diels-Alder condensation generally are not as light colored as is desirable for use in the preparation of light colored, fire retardant plastic materials such as polyesters. The precise reason why the polyhalo anhydrides, which in pure form are white, are generally obtained from the Diels-Alder preparation even after washing with materials such as toluene, with a dark, usually tan or brownish, color is not completely understood. Analysis of the dark colored polyhalo anhydrides usually indicates that the anhydrides are chemically very pure and contain only minute amounts of impurities. It is, of course, assumed that this small amount of impurities is the principal cause of the darkening of the polyhalo anhydrides. While analysis and study of these darkening impurities has not as yet conclusively established their chemical or physical composition, it is believed that they are primarily degradation products of the halo substituted cyclopentadienes which are produced in the Diels-Alder condensation.

The removal of the darkening impurities from the polyhalo anhydrides as manifested by an improvement in the color of the polyhalo anhydrides, as hereinbefore indicated, has been very difficult to achieve. While certain purification methods such as treating a solution of the polyhalo anhydrides with conventional decolorizing agents achieved some degree of color improvement or lightening of the polyhalo anhydrides, such procedures are highly undesirable since they require costly handling of the anhydrides and result in considerable mechanical loss of the valuable polyhalo anhydrides. As previously indicated, however, these darkening impurities may be removed from the polyhalo anhydrides and the color of the polyhalo anhydrides greatly improved according to the process of this invention by treating the polyhalo anhydrides with alcohols. The successful use of alcohols to achieve this highly desirable result is quite surprising, however, as it normally would be exjected that the alcohols would react with the highly reactive polyhalo anhydrides to form the corresponding esters and thus destroy the valuable polyhalo anhydrides instead of improving their color. Actually, however, when the treatment is effected according to the conditions of the process of this invention, as hereinafter described, little, if any, ester formation takes place with substantially no destruction of the treated polyhalo anhydrides through reaction with the treating alcohol. The mechanical loss of any of the polyhalo compound during the treatment is also greatly minimized and, moreover, recovery of the treated polyhalo anhydride greatly simplified through use of alcohols according to this invention because the polyhalo compounds are substantially insoluble in the alcohols which permits ready separation of the polyhalo anhydrides from the alcohols after treatment.

The color improvement process of this invention which may be defined as a lightening of the color of polyhalo anhydrides by removal of the darkening impurities formed in the Diels-Alder preparation is effected, in general, by contacting the polyhalo anhydrides with an alcohol. The alcohols which may be used for this purpose, either individually or in admixture, are monohydric lower alkyl alcohols which have from 1 to about 5 carbon atoms per molecule and which are immiscible with the polyhalo anhydrides. Included within this group are methyl, ethyl, n- and isopropyl, isobutyl or amyl alcohols. Of the different alcohols which may be used in the process, the best results in respect to color improvement and low loss of treated polyhalo anhydrides are most often obtained with methyl alcohol and, accordingly, it is the preferred alcohol for use in the process of this invention.

In carrying out the treatment process of this invention, which may be effected in either a batch or continuous type manner, the polyhalo anhydride to be color improved, preferably in a finely divided state, is charged to a suitable vessel. The polyhalo anhydride is then contacted therein with the alcohol with mixing or agitation for a period sufficient to effect the desired color improvement of the dark colored anhydride to a lighter colored anhydride. When the treatment is complete, since the polyhalo anhydride is substantially completely insoluble in the treating alcohol, recovery of the polyhalo anhydride is readily effected by conventional and economical separational methods such as decantation or filtration. The quantity of the alcohol used in the treatment is not critical and is dependent upon such factors as the degree of contamination of the polyhalo anhydride to be treated, the particular alcohol being used, the temperature of the treatment and the degree of mixing. Geenrally, the alcohol may be used in an amount ranging from about 5 to 800 percent of the weight of the polyhalo anhydride being treated with amounts of from about 20 to 100 percent generally being preferred. The temperature at which the treatment is effected is important as the use of too high a temperature will result in esterification of the polyhalo anhydride by reaction with the alcohol and the use of too low a temperature will result in poor color improvement. The temperature which may be used will vary depending upon the particular polyhalo anhydride being color improved and the alcohol used. Generally, the temperature may range from about 15° C. to 50° C. with a preferred range being from about 20° C. to 30° C. The duration of the treatment is not critical and depends upon such factors as the particle size of the polyhalo anhydride, the alcohol being used, the degree of mixing, the degree of contamination of the polyhalo anhydride and the temperature of the treatment. For example, the duration of the treatment using an alcohol, such as methanol, may range for from about 1 to 2 minutes in equipment such as a cycling batch centrifuge to about one or two hours in a slowly stirred batch vessel. In any case, the duration of the treatment may be readily determined by observation of the color change of the initially dark polyhalo anhydride and the treatment terminated when the color changes to a desired whitish color.

The following examples are cited to illustrate the color improvement process of this invention. In these examples the color of the treated and untreated polyhalo anhydride is referred to in terms of Hazen color value numbers and the higher the number, the darker the color. These Hazen color values were determined according to the following procedure: A 4 gram sample was dissolved in 100 milliliters of acetone and the Hazen color value of the solution was determined using a Hellige Aqua Test Meter by comparison with American Public Health Association Standards having Hazen values of from 0 to 70. For colors darker than a Hazen value of 70, 10 milliliters of the above solution were diluted with 100 milliliters of acetone and the Hazen value obtained was multiplied by the appropriate factor of 10.

Example I

A polyhalopolyhydromethanonaphthalenedicarboxylic anhydride was color improved according to the process of this invention by the following procedure:

About 5 grams of a finely divided 5,6,7,8,9,9-hexachloro-1,2,3,4,4a,5,8,8a-octahydro - 5,8 - methano - 2,3-naphthalenedicarboxylic anhydride prepared in the Diels-Alder condensation of hexachlorocyclopentadiene and tetrahydrophthalic anhydride and having a tanish color and a Hazen color value of 200 and about 4 grams of methyl alcohol were charged to a vessel and mixed therein at a temperature of about 25° C. for about one hour. The anhydride was then separated from the alcohol by filtration and air dried to recover a color improved anhydride having a whitish color and a Hazen color value of 70.

Example II

The treatment procedure of Example I was repeated using different portions of the same anhydride treated in Example I and a number of different treating materials. The results of such treatment for each of the treating materials used are recited in the following table and may be contrasted with the color improvement obtained when using a lower alkyl alcohol such as methyl alcohol:

| Treating material | Hazen value | |
|---|---|---|
| | Before treatment | After treatment |
| Methyl alcohol | 200 | 70 |
| Ethylene dichloride | 200 | 120 |
| Benzene | 200 | 140 |
| Dichloro benzene | 200 | 160 |
| Ethyl benzene | 200 | 160 |
| Xylene | 200 | 160 |
| Hexane | 200 | 200 |
| Hexachlorocyclopentadiene | 200 | 200 |
| Carbon tetrachloride | 200 | 200 |
| Toluene | 200 | 200 |
| Chloro benzene | 200 | 200 |

We claim as our invention:

1. A process for color-improving 5,6,7,8,9,9-hexahalo-1,2,3,4,4a,5,8,8a-octahydro - 5,8 - methano-2,3-naphthalenedicarboxylic anhydride in which the halogens are chlorine or bromine, which comprises contacting the anhydride at a temperature of from about 15° C. to about 50° C. with a monohydric alkyl alcohol of from 1 to about 5 carbon atoms per molecule and separating the color improved anhydride from the alcohol.

2. The process according to claim 1 wherein the alcohol is methyl alcohol.

3. The process according to claim 1 wherein the alcohol is used in an amount of from about 5 to 800 percent of the weight of the anhydride to be color improved.

4. The process according to claim 1 wherein the color improved anhydride is separated from the alcohol by filtration.

5. A process for color improving 5,6,7,8,9,9-hexachloro-1,2,3,4,4a,5,8,8a-octahydro-5,8 - methano - 2,3 - dicarboxylic anhydride which comprises contacting the anhydride at a temperature of from about 15° C. to 50° C. with methyl alcohol in an amount of from about 5 to 800 percent of the weight of the anhydride, and thereafter separating the color improved anhydride from the alcohol.

References Cited

UNITED STATES PATENTS 3,017,431   1/1962   Schmerling _____ 260—346.3

ALEX MAZEL, *Primary Examiner.*

BERNARD I. DENTZ, *Assistant Examiner.*